United States Patent [19]
Grage et al.

[11] Patent Number: 5,192,979
[45] Date of Patent: Mar. 9, 1993

[54] METHOD AND APPARATUS FOR RECOGNIZING AND IDENTIFYING TARGETS

[75] Inventors: Ludger Grage, Eichenau; Wolfgang Kranz, Munich; Gerhard Brumme, Eching, all of Fed. Rep. of Germany

[73] Assignee: Siemens Aktiengesellschaft, Munich, Fed. Rep. of Germany

[21] Appl. No.: 652,374

[22] Filed: Feb. 7, 1991

Related U.S. Application Data

[63] Continuation of Ser. No. 796,352, Sep. 18, 1985, abandoned.

[30] Foreign Application Priority Data

Sep. 26, 1984 [DE] Fed. Rep. of Germany ....... 3435295

[51] Int. Cl.$^5$ .................... G01S 13/00; G01P 3/36; H04B 10/00
[52] U.S. Cl. ................................ 356/28.5; 342/192; 356/4.5; 356/5; 359/112; 359/168; 359/169
[58] Field of Search ................ 356/4.5; 352/192; 359/112, 168, 169

[56] References Cited

U.S. PATENT DOCUMENTS

| | | | |
|---|---|---|---|
| 3,150,363 | 9/1964 | Finvold . | |
| 3,733,603 | 5/1973 | Johnston | 342/192 |
| 3,825,340 | 7/1974 | Debart | 356/28.5 X |
| 3,841,755 | 10/1974 | Debart | 356/28.5 |
| 3,950,100 | 4/1976 | Keene et al. | 356/28.5 |
| 4,167,329 | 9/1979 | Jelalian et al. | 356/28.5 X |
| 4,241,350 | 12/1980 | Uffelman | 342/192 X |
| 4,299,484 | 11/1981 | Holzapfel | 356/28.5 X |
| 4,415,898 | 11/1983 | Gaunaurd et al. | 342/192 |
| 4,545,250 | 10/1985 | Miwa | 73/599 X |
| 4,551,018 | 11/1985 | Mannava et al. | 73/657 X |
| 4,552,456 | 11/1985 | Endo | 356/28.5 X |
| 4,569,588 | 2/1986 | Nishiwaki et al. | 356/28.5 |
| 4,594,000 | 6/1986 | Falk et al. | 356/28.5 X |
| 4,603,331 | 7/1986 | Wehner | 342/192 |
| 4,635,058 | 1/1987 | Sutphin, Jr. | 342/192 X |
| 4,641,138 | 2/1987 | Opitz | 342/192 |
| 4,673,940 | 6/1987 | Barley et al. | 342/192 |

*Primary Examiner*—Stephen C. Buczinski
*Attorney, Agent, or Firm*—Hill, Steadman & Simpson

[57] ABSTRACT

A method and apparatus detects and identifies targets using a laser and operating in accordance with Doppler radar techniques. A laser sensor comprises a laser transmitter and an optical superheterodyne receiver and detects characteristic surface vibrations of targets and derives, from the laser echo signals, after frequency conversion and demodulation, low frequency oscillations having the frequencies of the vibration spectrum, from which, through comparison with patterns of known targets, provides detection and identification of the target.

15 Claims, 4 Drawing Sheets

METHOD AND APPARATUS FOR RECOGNIZING AND IDENTIFYING TARGETS

This is a continuation of application Ser. No. 796,352, filed Sep. 18, 1985, now abandoned.

BACKGROUND OF THE INVENTION

1. Field of the Invention

The present invention relates to a method and to apparatus for detecting and identifying targets, by utilizing radar (radio detecting and ranging) principles for detecting and identifying targets.

2. Description of the Prior Art

For the detection and identification of military targets in combat, various active and passive operating methods are known. As apparatus for carrying out these methods, e.g. radar apparatus, thermal sensitive sensors, and thermal imaging apparatus, are employed. The peculiar features of the various installations prove to be an advantage or disadvantage in the case of the more difficult use in combat, in dependence upon a large number of accompanying circumstances.

In the use of radar apparatus, predominantly the Doppler frequency components of the echo signals of moving targets or of moving portions of these targets are evaluated, for example through spectroanalysis for detection and identification. Passive installations exploit, for example, the thermal radiation of targets and derive, from the modulation of the thermal radiation, such as is effected by the rotor of a helicopter, characteristic features for detection or identification.

SUMMARY OF THE INVENTION

The object of the present invention is to improve the detection and identification of targets by a method which proceeds from the knowledge that drive assemblies of all objects employed bring about corresponding vibration manifestations on their surfaces.

According to the invention, the above object is achieved through the utilization of a laser sensor, consisting of a laser transmitter comprising an optical receiver, designed in the form of a superheterodyne receiver, and through a demodulator, arranged at the output of the optical receiver, with automatic adaptation to the Doppler frequency shift caused by the speed of the target. An evaluation circuit serves the purpose of the formation of a detection or identification result from the demodulated signals in the time range or frequency range through comparison with patterns of known targets, which patterns are stored in and may be recalled from a memory.

The characteristic vibration spectrum resulting on the surface of the objects modulates the laser beam, directed to the object, in frequency, or in phase, respectively. The reflected echo signals therefore contain a modulation and frequency which is exclusively due to surface vibrations. Since all surface portions of an object execute oscillations with the vibration frequency, it is unimportant what portion is illuminated by the laser beam. The advantage resulting from this, in comparison to other known methods, is that the detection and identification are independent of the aspect angle.

In accordance with an advantageous feature of the invention, for carrying out the method of the invention, a laser having a wavelength in the infrared range is employed, for example, a $CO_2$ laser. This wavelength is far smaller than the vibration amplitude on the surface of an object. Therefore, a good modulation magnitude is guaranteed, and hence the evaluation of even very low vibration frequencies down to 1 Hz is ensured.

If the target illuminated by the laser beam exhibits a motion, then the frequency of the modulated echo signal, to be attributed to the vibration oscillations, is shifted with a speed-dependent second Doppler frequency. The automatic adaptation of the demodulator in the superheterodyne receiver to the frequency shift can be advantageously achieved with the aid of a phase locked loop (PLL) circuit.

BRIEF DESCRIPTION OF THE DRAWINGS

Other objects, features and advantages of the invention, its construction and operation, will be best understood from the following detailed description, taken in conjunction with the accompanying drawings, on which.

DESCRIPTION OF THE PREFERRED EMBODIMENTS

Figure 1:
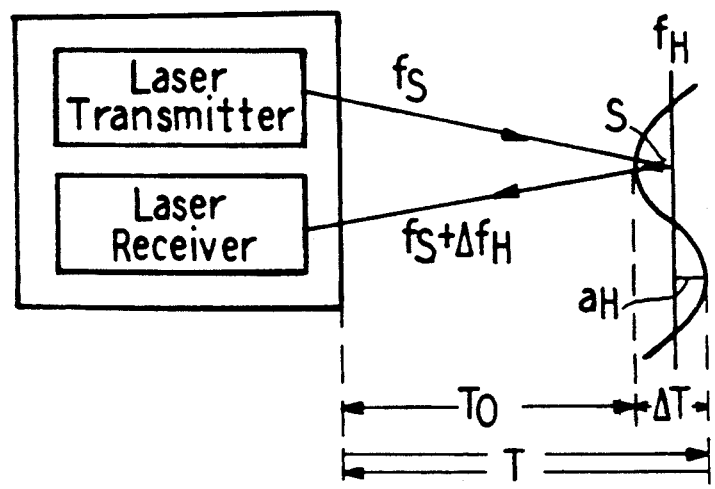
FIG. 1 is a schematic representation illustrating the development of the frequency modulation of a laser beam through surface vibrations of a helicopter.

Using the example of a helicopter, on the basis of FIG. 1, the modulation of a laser beam due to the vibration of a helicopter airframe, generated by the drive assembly, is illustrated. A hovering helicopter is irradiated with a frequency $f_S$ of a laser transmitter. The oscillation of the transmitted signal is sinusoidal and described through the relationship $$A_s = a_s \cos \Omega_s t$$

where $A_s$ is the amplitude after expiration of the time t, $a_s$ is the maximum amplitude, and $\Omega_s$ is equal to $2\pi f_s$ and is the angular frequency. The signal is reflected from the helicopter and, after a total travel time T, arrives with a phase $\phi$ in the receiver.

For the purpose of simplification, it is assumed that the mechanical oscillation which occurs at the reflection location of the body of the helicopter, is sinusoidal and progresses with a single frequency $f_H$. This can be described by the relationship $$s(t) = a_H \sin W_H t$$

where s is the amplitude after expiration of the time t, $a_H$ is the maximum amplitude and $W_H$ is the angular frequency. It is further assumed that the deflection s of the body of the helicopter proceeds precisely in the direction of the receiver. The transit time T is thereby modulated in the rhythm of the vibration. With these assumptions, it can be mathematically derived, in a simple manner, that the reflected laser beam exhibits a frequency modulation.

The resulting modulation index m obeys the relationship $$m = \frac{4\pi a_H}{\lambda_s}$$

where $\lambda_s$ is the wavelength of the transmitted signal. Generally, the vibration amplitude $a_H$ of the object is far greater than the wavelength $\lambda_s$ of the laser.

Due to this, the reflected laser beam is well modulated and leads to a large frequency deviation. Therefore, a good signal-to-noise ratio can be expected, since the latter increases in the case of a frequency modulation with an increasing frequency deviation.

If the helicopter exhibits a relative speed, then the latter leads to an additional Doppler frequency shift which must be taken into account in the signal processing in the receiver.

Figure 2:
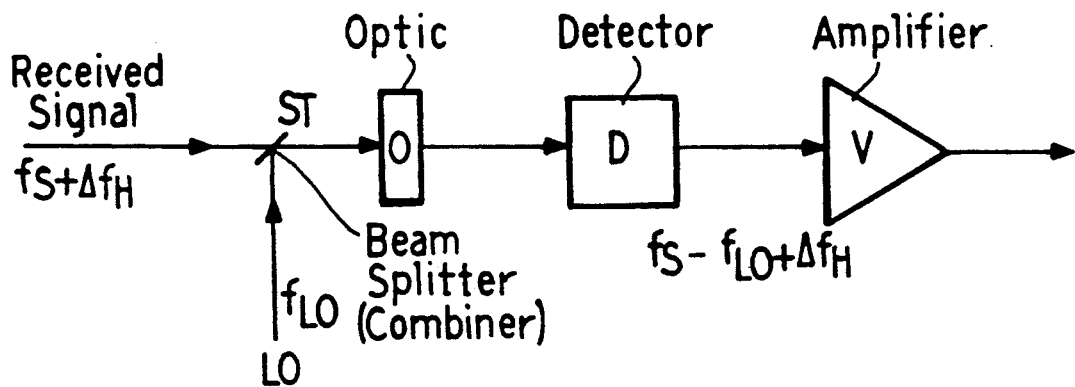
FIG. 2 is a block diagram of the basic structure of an optical superheterodyne receiver.

For processing the laser echo signals, an optical superheterodyne receiver is required. As is apparent from FIG. 2, the received signal comprises the modulation spectrum $\Delta f_H$ with a carrier frequency $f_S$. For demodulation, the carrier frequency $f_S$ in the receiver must be known; i.e. a superheterodyne receiver is necessary. The basic structure of an optical superheterodyne receiver is illustrated in FIG. 2. On the detector there is heterodyned with the received signal of the frequency $f_{S+\Delta f_H}$, the local oscillator signal LO having the frequency $f_{LO}$, coupled in via a beam divider ST and an optics O. At the output of the detector D there results the mixed product of the two signals having the frequency $f_S - f_{LO} + \Delta f_H$. The frequency difference between the carrier frequency and the local oscillator frequency must have the constancy necessary for the superheterodyne reception. The two frequencies should therefore be derived from a coherent source. The mixed product at the output of the detector D is supplied to an amplifier V for further processing.

Figure 3A:
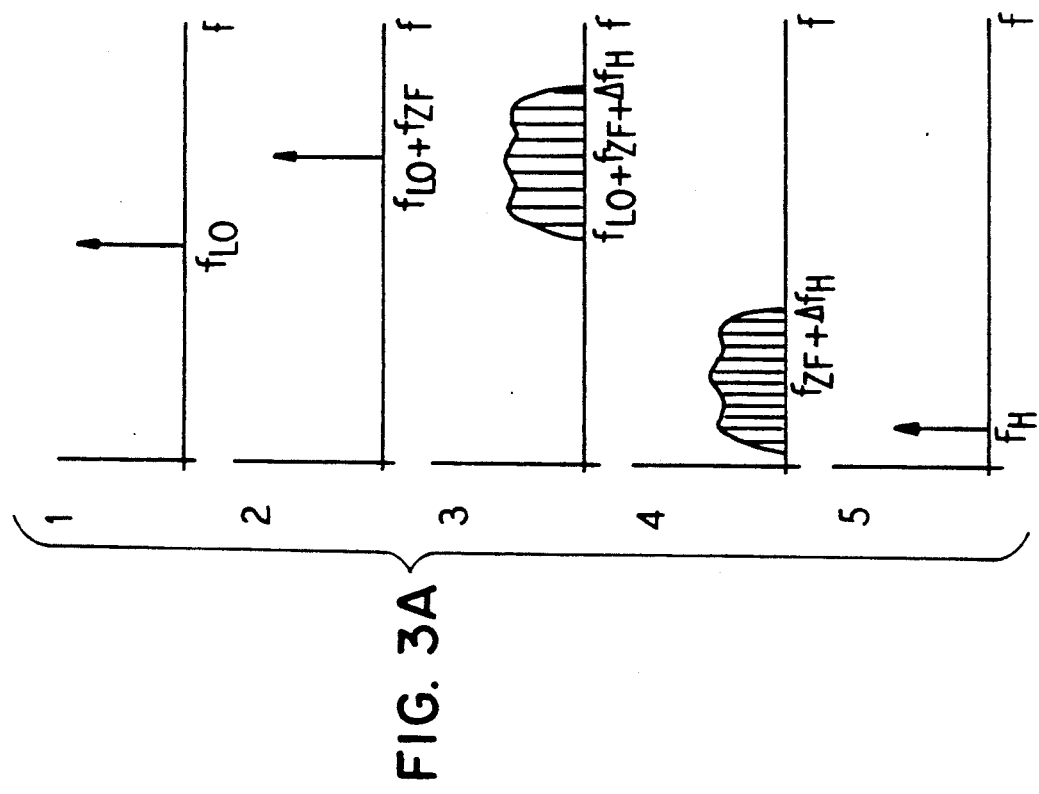
FIGS. 3 and 3a comprise a block circuit diagram and a related signal diagram to illustrate obtaining information with a laser sensor.
Figure 3:
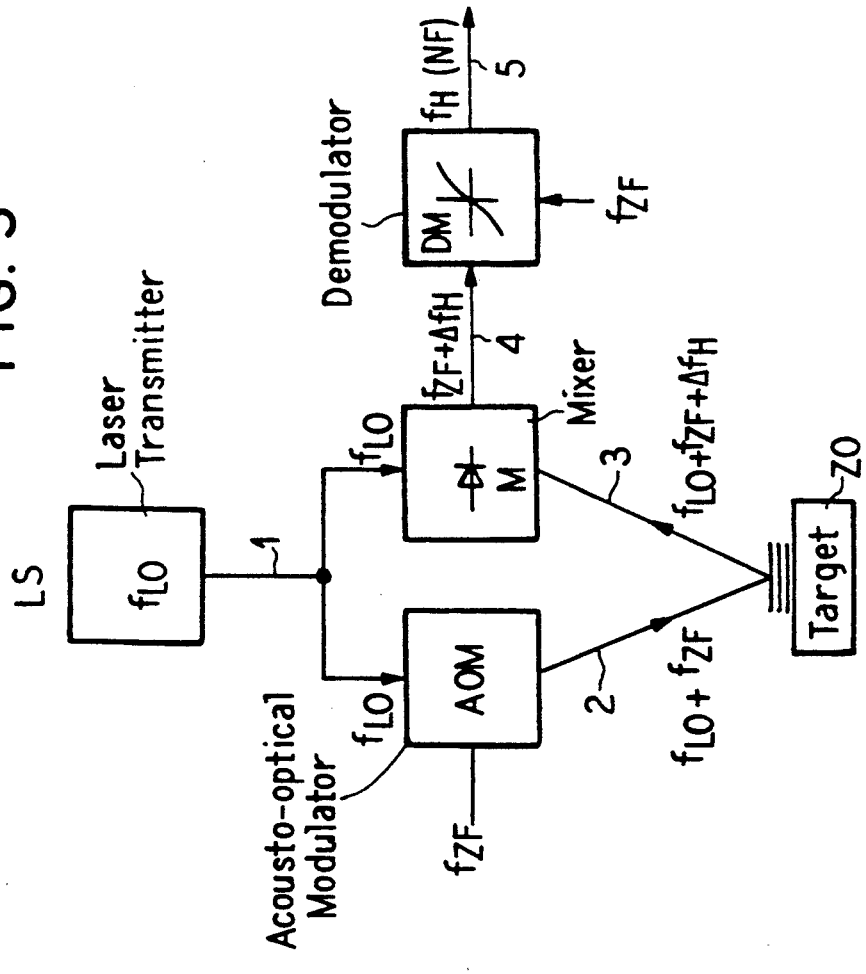

The obtaining of information shall now be described on the basis of FIGS. 3 and 3a. A laser beam of a laser transmitter LS having a frequency $f_{LO}$ is frequency shifted with an acousto-optical modulator AOM by an intermediate frequency $f_{ZF}$ (in the MHz range). The output signal having the frequency $f_{LO} + f_{ZF} = f_S$ illuminates the target ZO and is frequency modulated through the vibration of its surface. The signal reflected to the receiver contains the frequency modulation $\Delta f_H$ with a carrier frequency $f_{LO} + f_{ZF}$. At the output of a mixer M of the receiver, after mixing of this frequency with the frequency $f_{LO}$ of the laser transmitter, the frequency modulation $\Delta f_H$ is obtained at the intermediate frequency $f_{ZF}$. The latter can be demodulated in a demodulator DM to the actual vibration oscillations $f_H$.

Figure 4:
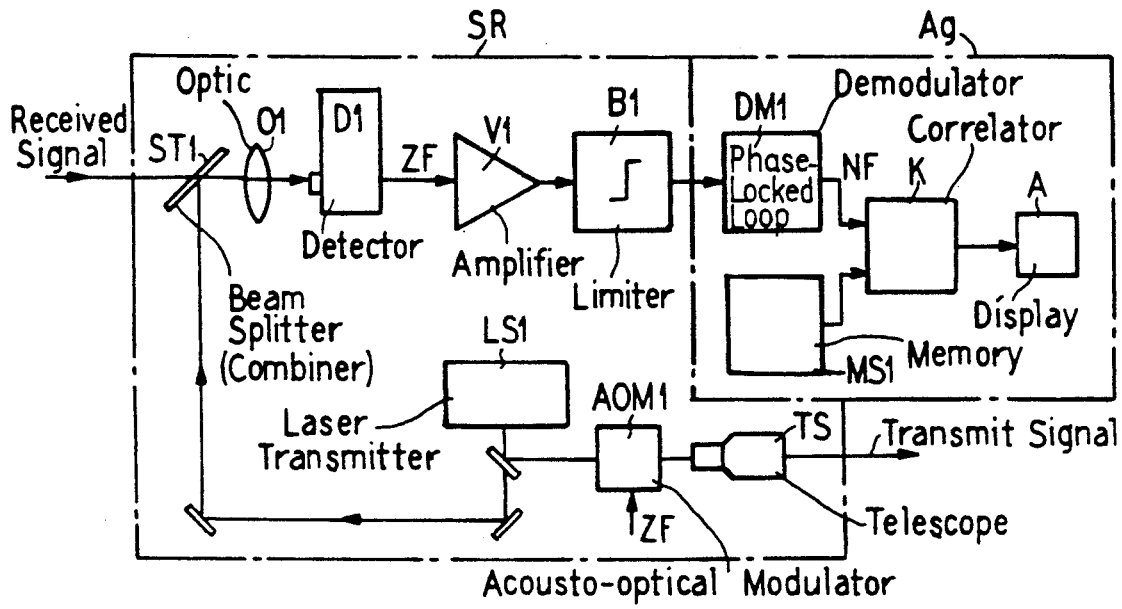
FIG. 4 is a block diagram of an exemplary embodiment of a laser sensor having an evaluation circuit for a laser transmitter operating in the continuous wave (CW) mode.

An exemplary embodiment of a laser sensor having an evaluation circuit for a laser transmitter operating in a CW mode is illustrated in FIG. 4. The transmitting frequency, generated in a transmitter LS, designed for example in the form of a $CO_2$ laser, is irradiated in the form of a transmitted signal via a telescope TS. The frequency shift, necessary for the optical receiver which is designed in the form of a superheterodyne receiver, by an intermediate frequency ZF occurs in an acousto-optical modulator AOM1. The LO signal is input coupled by way of a beam divider ST1, together with the received signal reflected at the target, into the optical superheterodyne receiver. The two signal components arrive by way of an optics O1 to the input of a detector D1 whose output delivers the modulation signal with a center frequency lying at the intermediate frequency. This signal is amplified in an amplifier V1, limited in a limiter B1, and subsequently demodulated in a frequency demodulator DM1, such that the vibration oscillation in the low frequency range results. The sum of all vibration oscillations on the surface of the target, which are disposed within the target area illuminated by the laser, then represents the characteristic vibration spectrum. In addition to the FM demodulator, a correlator K is an important component of the evaluation circuit. Through correlation with patterns of known targets in the time range, which are, for example, taken from a pattern memory MS1, the type of target can be determined and displayed in a display A.

The FM demodulator DM1 must, moreover, be so designed that, in addition to the frequency modulation resulting through vibration oscillations on the surface of the target, a Doppler frequency shift, dependent on the relative speed of the target, which is superimposed with the latter, is taken into account. In order to make the undesired Doppler frequency shift, which is dependent upon relative movement of the target, ineffective, it is necessary to use a tracking demodulator. Structurally this is possible through the utilization of a phase locked loop circuit.

Figure 5:
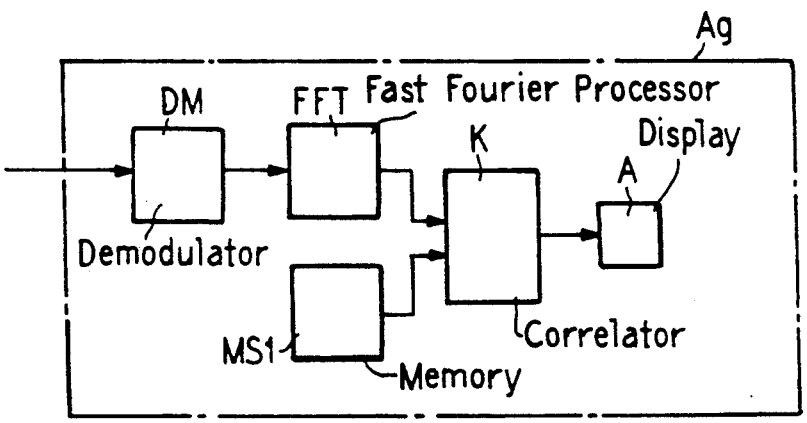
FIG. 5 is a block circuit diagram illustrating a modification of the evaluation portion of the embodiment of FIG. 4.

The evaluation of the vibration spectrum can proceed, differing from the exemplary embodiment according to FIG. 4, through utilization of a fast Fourier processor arranged between the FM demodulator DM1 and the correlator K, the fast Fourier processor converting the low frequency vibration oscillations from the time range into the spectral range. The correlation with the known patterns then proceeds in the frequency range (FIG. 5).

Figure 6:
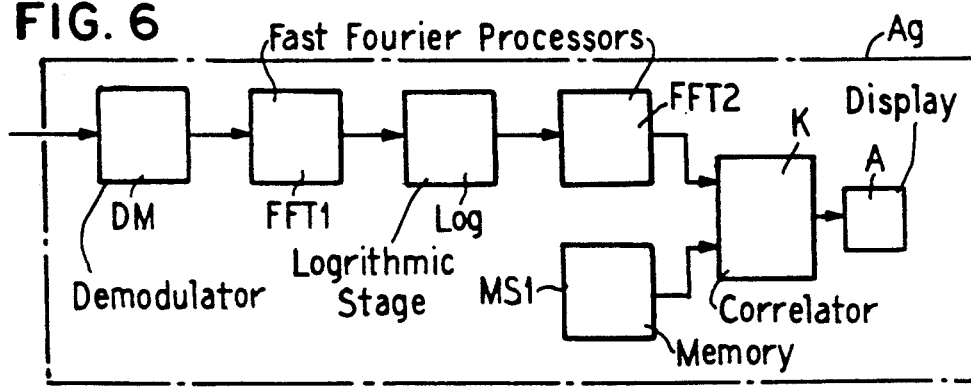
FIG. 6 is a block circuit diagram of another modification of the evaluation portion of the embodiment of FIG. 4.

In an additional exemplary embodiment according to FIG. 6, the ceptrum of the vibration oscillations is obtained through a double Fourier transformation between the output of the demodulator and the input of the correlator K1, whereby a logarithmation between the first and second Fourier transmission is carried out in the logarithmic stage Log. The identification of the target then proceeds in the same manner as in the case of the preceding exemplary embodiments, through correlation and display.

Figure 7:
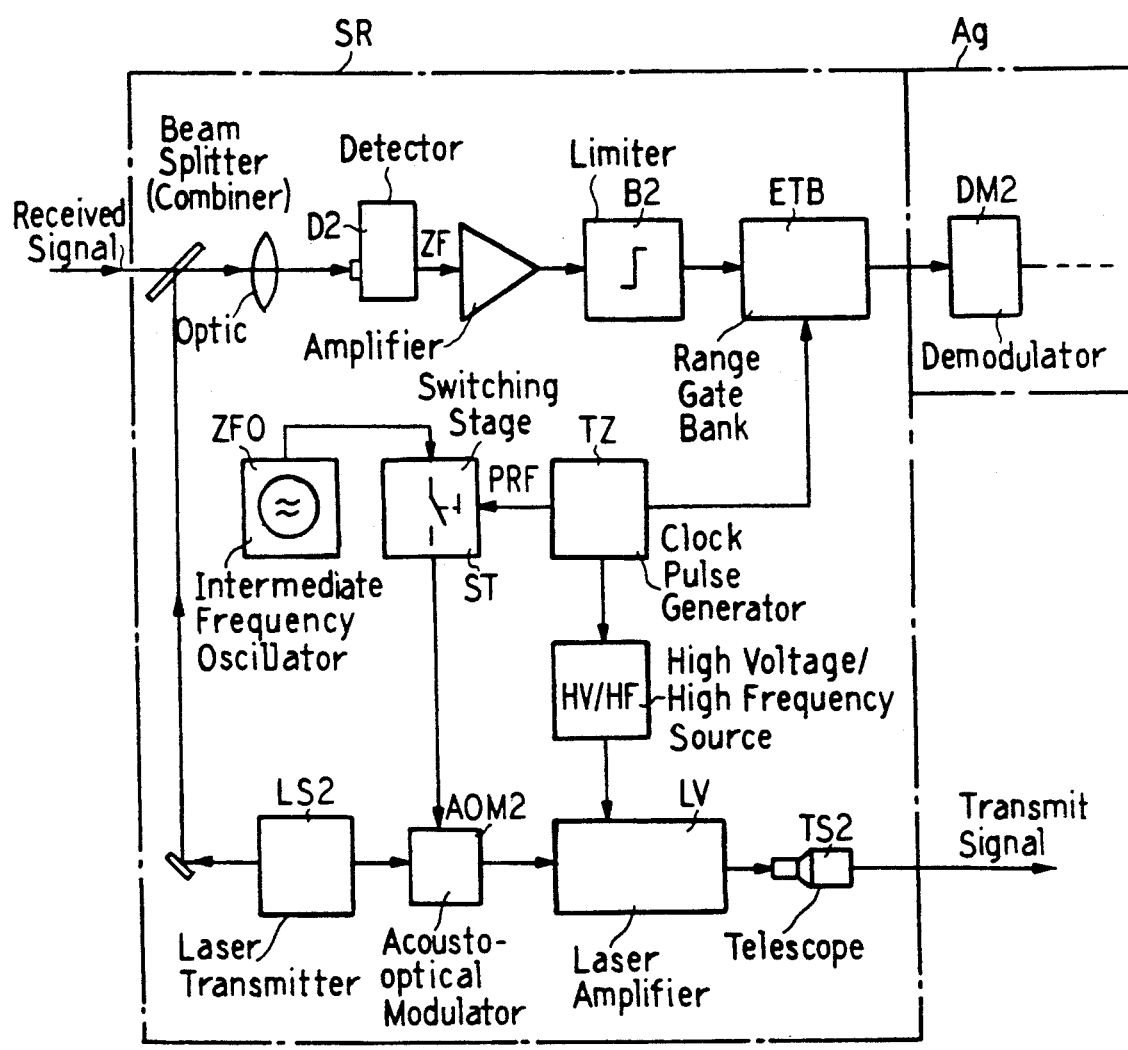
FIG. 7 is a block circuit diagram of an exemplary embodiment of a laser sensor having a pulsed laser transmitter.

An exemplary embodiment of the laser sensor, illustrated in FIG. 7, operates with a pulsed laser beam. The structure therefore corresponds to that of a pulse Doppler radar. For the formation of the intermediate frequency in a detector D2, the heterodyne signal, which is input coupled at the input of the optical receiver together with the received signal, is directly supplied from a continuous wave laser. Moreover, the CW laser feeds, by way of an acousto-optical modulator AOM2, a laser amplifier LV. A clock pulse central station TZ having a clock pulse generator generates the pulse frequency which delivers both clock pulse frequency for an intermediate frequency oscillator ZFO and the clock pulse frequency for a range gate bank, as well as the clock pulse frequency for a high voltage/high frequency source HV/HF. The clock pulse frequency transmitted to a switching stage ST corresponds to the pulse repetition frequency of the transmitted laser beam. The oscillator frequency, sampled in the switching stage ST in the clock pulse of the pulse repetition frequency, shifts the laser frequency by the intermediate frequency ZF in the acousto-optical modulator AOM2. The laser amplifier LV, which amplifies the shifted laser frequency, is additionally pulsed for excitation in the clock pulse of the pulse repetition frequency with high voltage or high frequency. The excitation pulse width is broader than the laser pulse fed by the acousto-optical modulator AOM2.

The processing of the echo signals in the receiving branch of the laser sensor differs from the previously-described exemplary embodiments through the utilization of a range gate bank ETB arranged at the output of the limiter B2. As a consequence of the utilization of the range gate bank ETB, the gate, in which the received signal of a target is disposed, is respectively connected through to the demodulator DM2.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A method using laser detecting and identifying targets on the basis of radar principles, comprising the steps of:
   (a) generating a laser beam as a carrier exclusively having a fixed frequency $f_{LO}$;
   (b) shifting the carrier with an intermediate frequency $f_{ZF}$ to obtain a further laser beam including the frequencies $f_{LO}$ and $f_{Zf}$;
   (c) transmitting the further laser beam from a transmitter and illuminating a target having a surface in continuous vibration independently of said further laser beam with the further laser beam causing the production, due to the continuous, independent vibration of said surface, of at least one frequency $f_H$ producing a frequency-modulated spectrum $\Delta f_H$ in a reflected laser beam;
   (d) receiving the reflected laser beam having a carrier frequency $f - f_{LO} + F_{ZF}$ and the frequency-modulated spectrum $\Delta f_H$;
   (e) mixing the received reflected laser beam with the carrier frequency $f_{LO}$ to obtain a modulation spectrum at the intermediate frequency $f_{ZF}$; and
   (f) modulating the remaining frequency signal to remove the intermediate frequency $f_{ZF}$ to provide a target signal having the frequency $f_H$ of the vibrating surface for identification of the target.

2. The method of claim 1, wherein, in response to movement of the target relative to the transmitter, the laser beam is subjected to a Doppler shift $f_D$ so that the reflected beam comprises frequency components $f_{LO} + f_{ZF} + f_{D \pm \Delta f_H}$, and wherein the step (f) of demodulating is further defined as:
   (f1) compensating the Doppler shift frequency $f_D$ so that removal of the intermediate frequency $f_{ZF}$ provides the target signal having the frequency $f_H$ of the vibrating surface.

3. The method of claim 1, and further comprising the step of:
   (g) correlating the target signal with stored signal patterns of known targets to identify the target.

4. The method of claim 3, and further comprising the step of:
   (h) transforming the target signal with a fast Fourier processor before the step (g) of correlating to convert the frequency from a time range into a spectral range.

5. The method of claim 3, and further comprising the step of:
   (h) prior to the step (g) of correlating, obtaining the vibrations spectrum of the target signal by
      (h1) transforming the target signal with a fast Fourier processor,
      (h2) logarithmizing the transformed signal, and
      (h3) transforming the logarithmic signal with a fast Fourier processor.

6. Laser apparatus for detecting and identifying targets having a vibrating surface by using radar principles comprising:
   a transmitter including generator means for generating a fixed frequency laser beam as a carrier, frequency shift means for shifting the carrier with an intermediate frequency, and transmitting the frequency-shifted beam onto a target having a surface vibrating at a frequency independent of said beam which modulates the beam with its vibrating surface and thereby generates a reflected beam modulated at a frequency corresponding to said frequency of the vibrations of said vibrating surface;
   a receiver including receiving means for receiving the reflected beam and mixer means coupled to said receiving means and to said generating means for removing the carrier;
   demodulator means for obtaining a signal with a Doppler frequency shift, said demodulator means connected to said mixer means for removing the intermediate frequency and producing the frequency of the vibrations as a target signal; and
   identification means connected to said demodulator means and including memory means storing patterns of referenced target signals, and comparison means for comparing the target signal with the reference signals to identify based on the frequency of vibrations of said vibrating surface.

7. The laser apparatus of claim 6, wherein: said demodulator means comprises a phase-locked loop circuit.

8. The laser apparatus of claim 6, wherein:
   said modulating means comprises a highly-stable local oscillator operable to produce the intermediate frequency.

9. The laser apparatus of claim 6, wherein:
   said generator means comprises a continuous wave laser generator.

10. The laser apparatus of claim 6, wherein:
    said generator means comprises a pulsed laser generator.

11. The laser apparatus of claim 6, wherein:
    said generator means comprises a $CO_2$ gas laser generator.

12. The laser apparatus of claim 6, wherein:
    said modulating means comprises an acousto-optical modulator.

13. The laser apparatus of claim 6, wherein:
    said comparison means comprises a correlator.

14. The laser apparatus of claim 13, and further comprising:

a fast Fourier processor connected between said demodulator means and said correlator for converting the target signals from the time range into a spectral range for signal correlation on the basis of frequency.

15. The laser apparatus of claim 13, and further comprising:

a fast Fourier processor connected to said demodulator means;

a logarithmic circuit connected to said fast Fourier processor; and a second fast Fourier processor connected to said logarithmic circuit and providing an output spectrum for correlation.

* * * * *